US009025928B2

(12) United States Patent
Watanabe

(10) Patent No.: US 9,025,928 B2
(45) Date of Patent: May 5, 2015

(54) PORTABLE TERMINAL APPARATUS, COMPUTER-READABLE RECORDING MEDIUM, AND COMPUTER DATA SIGNAL

(75) Inventor: Akira Watanabe, Hanno (JP)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 1895 days.

(21) Appl. No.: 11/824,800

(22) Filed: Jul. 2, 2007

(65) Prior Publication Data
US 2008/0075425 A1 Mar. 27, 2008

(30) Foreign Application Priority Data

Jul. 4, 2006 (JP) ................. 2006-183972

(51) Int. Cl.
*H04N 5/931* (2006.01)
*H04N 5/76* (2006.01)
*H04N 5/907* (2006.01)
*G11B 20/18* (2006.01)
*G11B 27/30* (2006.01)
*H04N 9/82* (2006.01)

(52) U.S. Cl.
CPC .......... *H04N 5/76* (2013.01); *H04N 5/907* (2013.01); *G11B 20/18* (2013.01); *G11B 27/3036* (2013.01); *H04N 9/8205* (2013.01); *G11B 2020/1823* (2013.01)

(58) Field of Classification Search
USPC ....................................... 386/207
See application file for complete search history.

(56) References Cited

U.S. PATENT DOCUMENTS

| 7,003,213 | B1* | 2/2006 | Hasegawa ............... 386/291 |
| 7,260,316 | B2* | 8/2007 | Matsuo ............... 386/269 |
| 2002/0053090 | A1* | 5/2002 | Okayama et al. .......... 725/152 |
| 2003/0046699 | A1* | 3/2003 | Nonomura et al. ......... 725/58 |
| 2003/0145334 | A1* | 7/2003 | Motoe et al. ............. 725/123 |
| 2004/0023683 | A1 | 2/2004 | Mizuhiki et al. |
| 2005/0085184 | A1 | 4/2005 | Kaneda |
| 2005/0151859 | A1* | 7/2005 | Kuriyama et al. ...... 348/231.99 |
| 2006/0104610 | A1* | 5/2006 | Suh ................... 386/69 |

(Continued)

FOREIGN PATENT DOCUMENTS

| CN | 1611058 | 4/2004 |
| JP | 10-79908 | 3/1998 |

(Continued)

*Primary Examiner* — Thai Tran
*Assistant Examiner* — Jose Mesa
(74) *Attorney, Agent, or Firm* — Cozen O'Connor

(57) ABSTRACT

In a portable terminal apparatus, a CPU determines receiving condition of broadcast data received by a television broadcast receiving unit, while recording the received data, and records information indicating receiving condition according to the determination result. The CPU obtains information indicating recording condition of the recorded broadcast data based on information indicating receiving condition, and displays the obtained information on a main display unit. Specifically, the CPU sequentially receives time stamps synchronous with broadcast data while receiving and recording the broadcast data, and records them in time series as information indicating receiving condition. The CPU determines whether time stamps recorded in time series are temporally continuous, and specifies any error portion where the recorded broadcast data has not been received normally, according to the determination result. The CPU displays a bar chart showing distribution of error portions in the total broadcast data recorded, as information indicating recording condition.

14 Claims, 7 Drawing Sheets

(56) References Cited

U.S. PATENT DOCUMENTS

| | | | |
|---|---|---|---|
| 2006/0117353 A1* | 6/2006 | Narita et al. | 725/72 |
| 2006/0153526 A1* | 7/2006 | Kimura | 386/83 |
| 2006/0268665 A1* | 11/2006 | Kang et al. | 368/47 |
| 2007/0195204 A1* | 8/2007 | Ha | 348/731 |
| 2008/0301513 A1* | 12/2008 | Starr | 714/748 |
| 2009/0074385 A1* | 3/2009 | Nishi | 386/124 |

FOREIGN PATENT DOCUMENTS

| | | |
|---|---|---|
| JP | 10-079908 | 3/1998 |
| JP | 11-103279 | 4/1999 |
| JP | 1020010068312 | 7/2001 |
| JP | 2002-199062 | 7/2002 |
| JP | 2003-188952 | 7/2003 |
| JP | 2003-309791 | 10/2003 |
| JP | 2004-282605 | 10/2004 |
| JP | 2004-364117 | 12/2004 |
| JP | 2005-073005 | 3/2005 |
| JP | 2005-073143 | 3/2005 |
| JP | 2005-086434 | 3/2005 |
| JP | 2005-101879 | 4/2005 |
| JP | 2005-123754 | 5/2005 |
| JP | 2005-140686 | 6/2005 |
| JP | 2005-323279 | 11/2005 |
| JP | 2006-108920 | 4/2006 |
| JP | 2006-129059 | 5/2006 |
| JP | 2006-148601 | 6/2006 |
| KR | 1020010068312 | 7/2001 |
| WO | WO 03/056792 | 7/2003 |
| WO | WO 2005 013586 | 2/2005 |

* cited by examiner

PORTABLE TERMINAL APPARATUS, COMPUTER-READABLE RECORDING MEDIUM, AND COMPUTER DATA SIGNAL

BACKGROUND OF THE INVENTION

1. Field of the Invention

The present invention relates to a portable terminal apparatus which receives and records broadcast data.

2. Description of the Related Art

A portable terminal apparatus having a television broadcast recording function for receiving and recording a television broadcast is generally available. While a television broadcast is recorded by such a portable terminal apparatus, the environment of television broadcast reception changes constantly along with traveling. Depending on the reception environment, the television radio wave might cease for a second, and reception failure might be caused to drop the recording condition accordingly. Specifically, due to the influence of the cease of the television radio wave, the recorded content might miss some images.

As a technique for dealing with such a happening, for example, Unexamined Japanese Patent Application KOKAI Publication No. 2005-323279 discloses a technique which makes up for any strangeness that might be felt by the user or keeps the user from misunderstanding, when playing a recorded program missing any images. Specifically, in playing a recorded program, this technique determines whether the portion being played is where the reception has ceased (an error portion). If it is determined to be the portion where the reception has ceased, a "reception disconnected" message (error message) is displayed. If a skipping operation by the user is detected while this message is displayed, the succeeding images are immediately displayed.

Further, for example, Unexamined Japanese Patent Application KOKAI Publication No. 2005-86434 discloses a technique for recording and playing a program by skipping a specific scene. Specifically, this technique records or plays a digital broadcast program by skipping commercials in the program.

According to the above-described conventional technique, the user can know that the recorded content includes error portions, from an error message displayed.

However, the user cannot know whether or not the recorded content includes many error portions, before most of the recorded content has been played. For example, if the user feels that the recorded content includes many error portions immediately after he/she starts playing the recorded content, this might merely be because, error portions happen to concentrate in the first half of the recorded content, or might be such a case that error portions to discourage the user from putting up with viewing or listening occur throughout the recorded content.

Accordingly, the user has to play the recorded content by checking the recording condition to determine whether or not to stop viewing in the midst of the play. For example, the user wastes a lot of time, if the user continues playing for a long time while being torn between wanting to continue viewing and wanting to stop viewing and finally stops viewing upon deciding that the content includes many error portions.

Further, for example, the user may sometimes once record the content of a television broadcast on a memory, and then store it on a storage medium for a long-term storage purpose. In such a case, if, for example, the user can spare no time to play the content recorded on the memory and stores the content without checking the recording condition, a useless content not worth viewing might be stored, as the case may be.

SUMMARY OF THE INVENTION

The present invention was made in view of the above-described circumstance, and an object of the present invention is to provide a portable terminal apparatus which allows a user to easily check the recording condition of a recorded content of broadcast data anytime, without checking the recording condition by playing the recorded content.

Another object of the present invention is to provide a portable terminal apparatus which controls whether or not to store a recorded content of broadcast data, according to the recording condition of the content, with no need for the user to check the recording condition.

To achieve the above objects, a portable terminal apparatus according to a first aspect of the present invention is a portable terminal apparatus for recording a broadcast data received, and comprises:

a determination unit which determines whether a receiving condition of broadcast data is normal or not, while the broadcast data is recorded;

a receiving condition information storage unit which stores information indicating the receiving condition, according to a result of determination by the determination unit;

a recording condition information obtaining unit which obtains information indicating a recording condition of the broadcast data recorded, based on the information indicating the receiving condition stored in the receiving condition information storage unit; and a recording condition information output unit which outputs the information indicating the recording condition obtained by the recording condition information obtaining unit.

A portable terminal apparatus according to a second aspect of the present invention is a portable terminal apparatus for recording broadcast data received, and comprises:

a determination unit which determines whether a receiving condition of broadcast data is normal or not, while the broadcast data is recorded;

a receiving condition information storage unit which stores information indicating the receiving condition, according to a result of determination by the determination unit;

a recording condition information obtaining unit which obtains information indicating a recording condition of the broadcast data recorded, based on the information indicating the receiving condition stored in the receiving condition information storage unit; and a control unit which controls whether or not to store the recorded broadcast data, according to the information indicating the recording condition obtained by the recording condition information obtaining unit.

A computer-readable recording medium according to a third aspect of the present invention stores a program for controlling a computer to realize principal functions of the portable terminal apparatus according to the first aspect of the present invention described above.

A computer-readable recording medium according a fourth aspect of the present invention stores a program for controlling a computer to realize principal functions of the portable terminal apparatus according to the second aspect of the present invention described above.

A computer data signal according to a fifth aspect of the present invention, which is embodied in a carrier wave, represents a program for controlling a computer to realize principal functions of the portable terminal apparatus according to the first aspect of the present invention described above.

A computer data signal according to a sixth aspect of the present invention, which is embodied in a carrier wave, represents a program for controlling a computer to realize principal functions of the portable terminal apparatus according to the second aspect of the present invention described above.

A portable terminal apparatus according to a seventh aspect of the present invention comprises:

a receiving unit which receives broadcast data, in which time information is inserted at intervals of a predetermined length;

a broadcast data recording unit which records the broadcast data received by the receiving unit;

a time information extracting unit which extracts the time information from the broadcast data received by the receiving unit;

a discontinuous portion specifying unit which specifies a portion where the time information is not continuous at the intervals of the predetermined length, from a time series of the time information extracted by the time information (extracting unit; and an abnormally recorded portion output unit which outputs information indicating the portion specified by the discontinuous portion specifying unit, as information indicating an abnormally recorded portion in the broadcast data recorded by the broadcast data recording unit.

A computer-readable recording medium according to an eighth aspect of the present invention stores a program for controlling a computer to realize principal functions of the portable terminal apparatus according to the seventh aspect of the present invention described above.

A computer data signal according to a ninth aspect of the present invention, which is embodied in a carrier wave, represents a program for controlling a computer to realize principal functions of the portable terminal apparatus according to the seventh aspect of the present invention described above.

According to the present invention, a user can easily check the recording condition of a recorded content of broadcast data anytime, without checking the recording condition by playing the recorded content.

Further, according to the present invention, it is possible to control whether or not to store a recorded content of broadcast data according to the recording condition of the content, with no need for the user to check the recording condition.

BRIEF DESCRIPTION OF THE DRAWINGS

These objects and other objects and advantages of the present invention will become more apparent upon reading of the following detailed description and the accompanying drawings in which:

FIG. 4 is a flowchart showing an entire operation of the portable telephone apparatus that is started when the power is turned on;

DETAILED DESCRIPTION OF THE PREFERRED EMBODIMENT

A preferred embodiment of the present invention will be explained below with reference to the drawings.

The present embodiment exemplifies a case that the present invention is applied to a portable telephone apparatus as a portable terminal apparatus.

Figure 1:
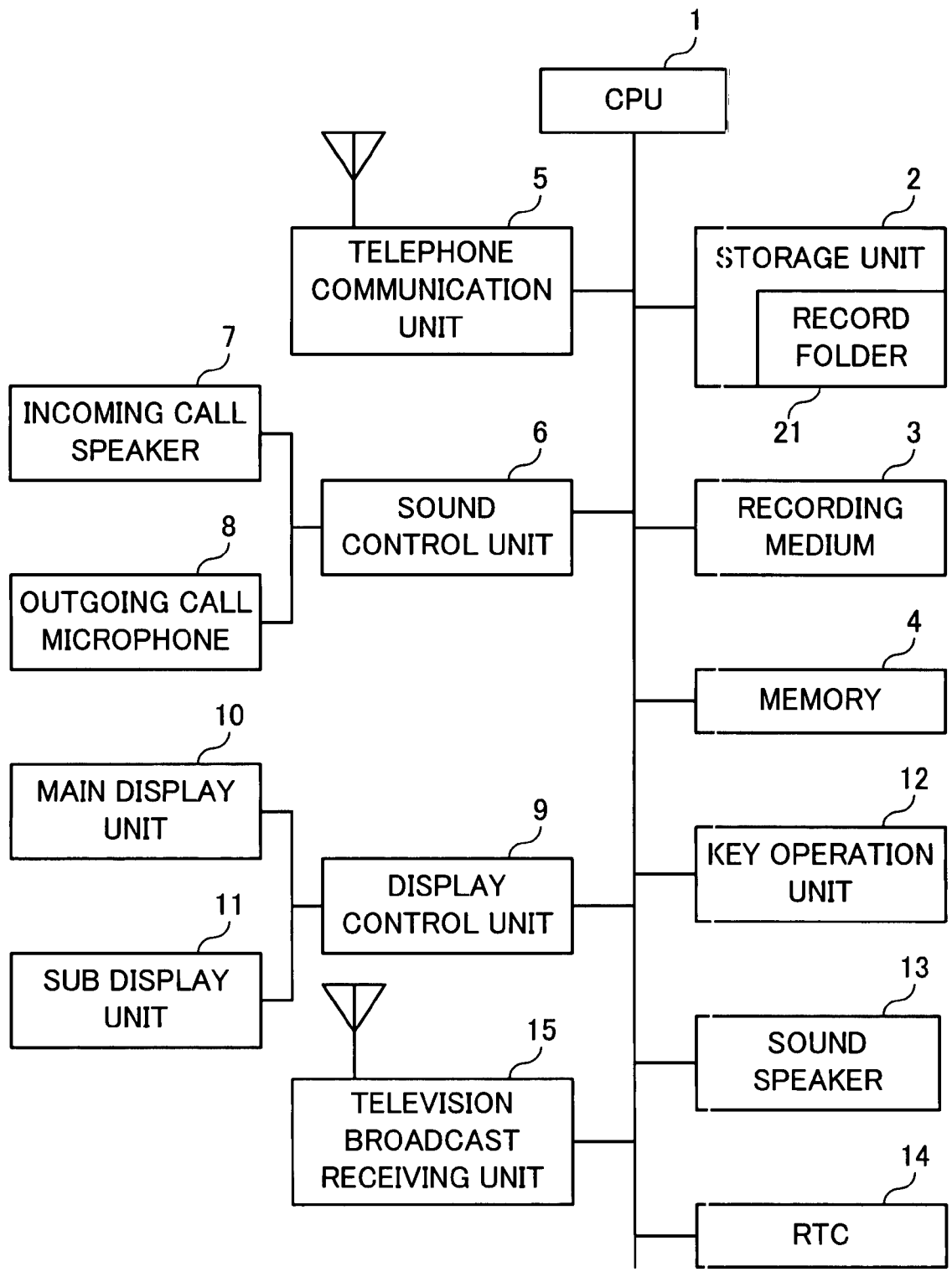
FIG. 1 is a block diagram showing basic structural element, of a portable telephone apparatus as a portable terminal apparatus.

FIG. 1 is a block diagram showing basic structural elements of the portable telephone apparatus.

For example, this portable telephone apparatus is a foldable one with its two housings (upper housing and lower housing) assembled free to open/close. The portable telephone apparatus has a communication function, an e-mail function, an Internet connection function (web access function), etc., and in addition, a television broadcast receiving function, a television broadcast recording function, and a recorded content playing function.

The television broadcast receiving function is a function for receiving a radio wave carrying a television broadcast. The portable telephone apparatus receives a digital terrestrial television broadcast intended for a portable receiver, by the television broadcast receiving function. Digital terrestrial television broadcasting allows multiplex broadcasting, in which video data and sound data of a television broadcast program, which are embedded with data of a datacast comprising text data, image data, etc. pertinent to the program, and embedded with EPG (Electronic Program Guide) data, etc., are sequentially distributed as broadcast data. The television broadcast recording function is a function for recording a television broadcast (videos and/or sounds) received by the television broadcast receiving function, in the order of reception. The recorded content playing function is a function for playing the content recorded by the television broadcast recording function.

In FIG. 1, a CPU 1 is a central processing device playing the core role in the portable telephone apparatus, and controls the entire operation of the portable telephone apparatus according to various programs in a storage unit 2. The CPU 1 is connected, via an internal bus, to a storage unit 2, a recording medium 3, a memory 4, a telephone communication unit 5, a sound control unit 6, a display control unit 9, a key operation unit 12, a sound speaker 13, an RTC (Real Time Clock) 14, and a television broadcast receiving unit 15 which are to be described later, and controls each of these units.

The storage unit 2 includes a program area and a data area. A program for controlling the portable telephone apparatus according to the present embodiment to perform operation procedures shown in FIG. 4 to FIG. 7, is stored in the program area. A record folder 21, etc. are stored in the data area of the storage unit 2. The record folder 21 stores, for administration purposes, a record file, which is generated when recording of a television broadcast is completed, for showing the recorded content.

The recording medium 3 a detachable carriable memory, and comprises, for example, a flash memory card, an IC card, or the like. The recording medium 3 is used for supplying various data and programs to the portable telephone apparatus from outside. Likewise the storage unit 2, the recording medium 3 stores a record file generated by the portable telephone apparatus.

The memory 4 is an internal memory including a work area, and comprises, for example, a DRAM (Dynamic RAM), an SDRAM (Synchronous DRAM), or the like. Data in the memory 4 is saved in the storage unit 2, as needed.

The telephone communication unit 5 includes an antenna constituting a wireless unit, and a sending/receiving unit (base band unit) connected to the antenna.

The telephone communication unit 5 acquires a signal received by the wireless unit from the receiving side of the sending/receiving unit, and demodulates the signal into an incoming base band signal. The telephone communication unit 5 decodes sound data included in the incoming base band signal, and supplies the decoded sound data to the sound control unit 6. The sound control unit 6 outputs the sound based on the sound data from an incoming call speaker 7.

The telephone communication unit 5 acquires sound data input from an outgoing call microphone 8, through the sound control unit 6. The telephone communication unit 5 encodes the sound data into an outgoing base band signal. The telephone communication unit 5 modulates the outgoing base band signal and supplies it to the sending side of the sending/receiving unit for the modulated wave to be launched (output) from the antenna.

Further, in a case where the telephone communication unit 5 receives and acquires display data by the e-mail function, the Internet connection function, or the television broadcast receiving function, the telephone communication unit 5 supplies the display data to the display control unit 9. The display control unit 9 controls display based on the display data to be output on a main display unit 10.

The main display unit 10 comprises an LCD (Liquid Crystal Display) or the like, and displays various screens.

A sub display unit 11 is controlled by the display control unit 9, and displays the present date and time, brief messages, icons, etc.

The key operation unit 12 is for the user to input various information by operating a dial, or by typing in texts or commands, etc. The key operation unit 12 comprises, for example, a television broadcast ON/OFF key for instructing start or termination of television broadcast viewing, a channel switch key for switching the channels to view, a recording start key for instructing start of television broadcast recording, a play key for instructing playing of a record file, etc. The key operation unit 12 may be a touch panel to be operated on the screen displayed on the main display unit 10. For example, the keys for performing any operations regarding a television broadcast may be allocated in a touch panel form on a screen of a television broadcast, when the screen is displayed on the main display unit 10.

The sound speaker 13 is a high sound pressure speaker, which outputs a ring alert, a television sound, etc. The sound speaker 13 is also driven when to give an alarm warning.

The RTC 14 is a module that constitutes a clock unit. The CPU 1 acquires the present date and time from the RTC 14.

The television broadcast receiving unit 15 receives a digital terrestrial television broadcast intended for a portable receiver such as a portable telephone, etc. The television broadcast receiving unit 15 can receive video information and sound information of a television broadcast which additionally includes, datacasting information, an EPG, etc. In the present embodiment, explanation will be given to a case where a broadcasting station launches a datacast comprising text data such as superimposed title, caption, etc.

The television broadcast receiving unit 15 comprises a TV antenna, a receiving unit connected to the TV antenna, and a signal processing unit connected to the receiving unit. The TV antenna receives airwaves launched from a broadcasting station. The receiving unit is an analog circuit unit, which extracts a broadcast signal from the airwave received by the TV antenna. The signal processing unit is a digital circuit unit, which applies various processes to the broadcast signal extracted by the receiving unit. Specifically, the signal processing unit demodulates a broadcast signal by OFDM (Orthogonal Frequency Division Multiplexing), decodes data of each kind by separating video data, sound data, and text data from a multiplexed broadcast signal, decompresses compressed data, etc. Video data of a television broadcast and text data of a datacast are output on the main display unit 10 by means of display, through the display control unit 9. Sound data of a television broadcast is output from the sound speaker 13 by means of sound.

Figure 2:
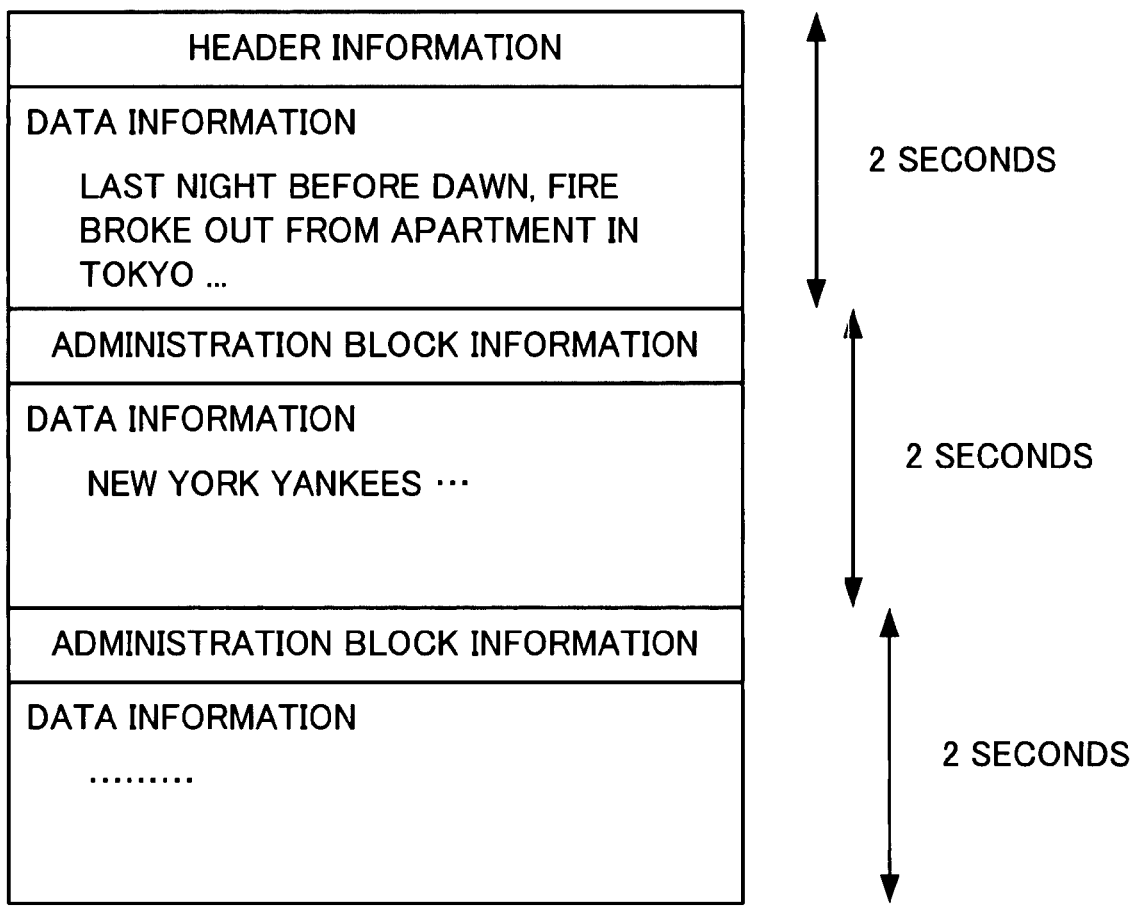
FIG. 2 is a diagram for explaining data of a datacast launched from a broadcasting station.

FIG. 2 is a diagram for explaining data of a datacast launched from a broadcasting station.

Data for datacasting is launched as divided into packets. Each packet includes "header information" or "administration block information", and "data information".

"Header information" is included in the first packet of the data for datacasting, and contains information which is likewise set in the "administration block information" to be described later, and in addition, administration information regarding the program on the whole. Specifically, in the "header information", "title" indicating the datacast name of the datacast concerned, "packet length" of the full body of the data for datacasting, "time stamp" for administrating time, "copyright information", etc., are set.

In "administration block information", "packet length" of the packet containing this "administration block information", "time stamp", etc. are set.

This "header information" or "administration block information" is launched from the broadcasting station at regular intervals (for example, at every two seconds).

In "data information", text data, as the content of datacasting, is set. The time stamp included in the "header information" and "administration block information" indicates the standard time of datacasting at intervals of a predetermined length. The text data in the "data information" is affixed with a display time, which is synchronous with this standard time, and displayed on the main display unit 10 according to the display time.

According to the present embodiment, while a television broadcast is being received and recorded, the CPU 1 extracts the time stamp (for example, a; broadcasting time) from the "header information" and the "administration block information" in the data for datacasting, which is embedded in the data of the television broadcast. After recording of the television broadcast is finished, the CPU 1 uses the (extracted time stamps to perform an error checking process of checking whether the television broadcast has been received and recorded normally.

According to the present embodiment, the time stamps included in the "header information" and the "administration block information" are used in the error checking process as described above. However, in a case where an error check code for this checking purpose is launched (output) from the broadcasting station at regular intervals such as once per second, the portable telephone apparatus may receive this error check code in the order of launch, and perform the error checking process by using the error check code. Alternatively, the portable telephone apparatus may generate this error check code. In this case, the portable telephone apparatus may, generate an error check code in synchronization with reception of television broadcast data each time it receives data, and affix the generated error check code to the received broadcast data.

Figure 3:
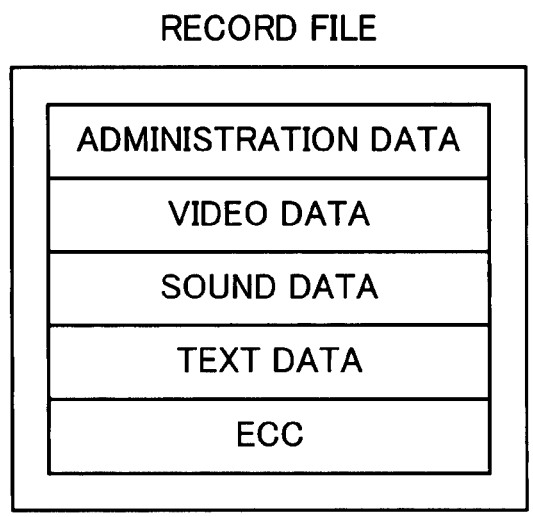
FIG. 3 is a diagram for explaining the content of a record file generated when a television broadcast is recorded.

FIG. 3 is a diagram for explaining the content of a record file generated when a television broadcast is recorded.

FIG. 3 illustrates a record file to be generated when broadcast data including both data of a television broadcast and data of a datacast is received, and video data and sound data of the television broadcast and text data of the datacast are recorded.

The record file comprises "administration data", "video data", "sound data", "text data", and "ECC (Error Checking Code)". Among them, "administration data", "video data", "sound data", and "text data" are data areas for administrating the content recorded by the television broadcast recording function, by each data type.

In the "ECC" area, the result of check obtained in the above-described error checking process is set as information indicating the recording condition of the record file.

While a broadcast data is received and recorded, the CPU 1 sequentially receives time stamps synchronous with the broadcast data, as information indicating the condition of reception of the broadcast data, and registers the time stamps in the memory 4 in time series.

After recording of the broadcast data is completed, the CPU 1 determines whether or not the time stamps recorded in time series are temporally continuous at intervals of a predetermined length, and according to the result of the determination, specifies any error portion, which is where reception of the recorded broadcast data has not been normal. Specifically, in a case where "header information" or "administration block information" of the datacast is launched from the broadcasting station at, for example, every two seconds, the CPU 1 determines whether or not the time stamps recorded in time series are continuous from one another at every two seconds, and specifies a portion that is not continuous at the interval of two seconds, as an error portion.

For example, the CPU 1 specifies any error portion by the times at which the error portion starts and ends, and sets the specified error portion in "ECC". In this manner, any specified error portion is set in the "ECC" area of the record file, as information indicating the recording condition of the record file.

Next, the operation concept of the portable telephone apparatus according to the present embodiment will be explained with reference to the flowcharts of FIG. 4 to FIG. 7.

The functions to be realized by each step described in these flowcharts being performed are stored in the storage unit 2 in the form of a program code readable by the CPU 1. By the CPU 1 controlling each unit that constitutes; the portable telephone apparatus according to the program code, the operation of the portable telephone apparatus shown in the flowcharts is performed in order.

The program code described above may be supplied from the outside to the storage unit 2 through the recording medium 3. Further, the portable telephone apparatus may perform the operation shown in the flowcharts in order, according to the above-described program code, which is transmitted through a transmission medium. That is, with the use of a program or data that is supplied from the outside, through not only a recording medium, but also a transmission medium, the operation unique to the present embodiment can be performed.

FIG. 4 to FIG. 7 are flowcharts showing the entire operation of the portable telephone apparatus that is started when the power is turned on.

Figure 4:
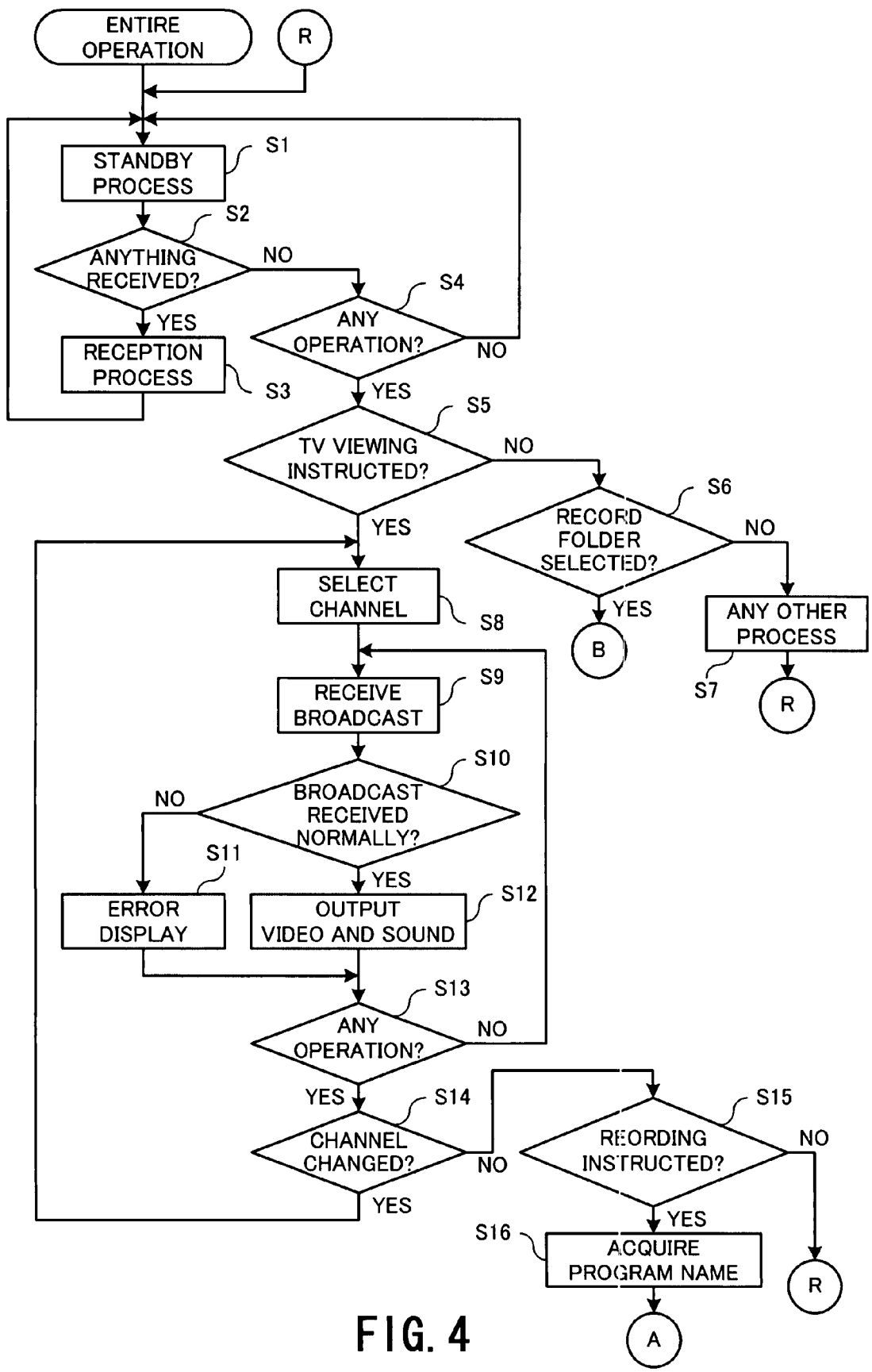
Figure 5:
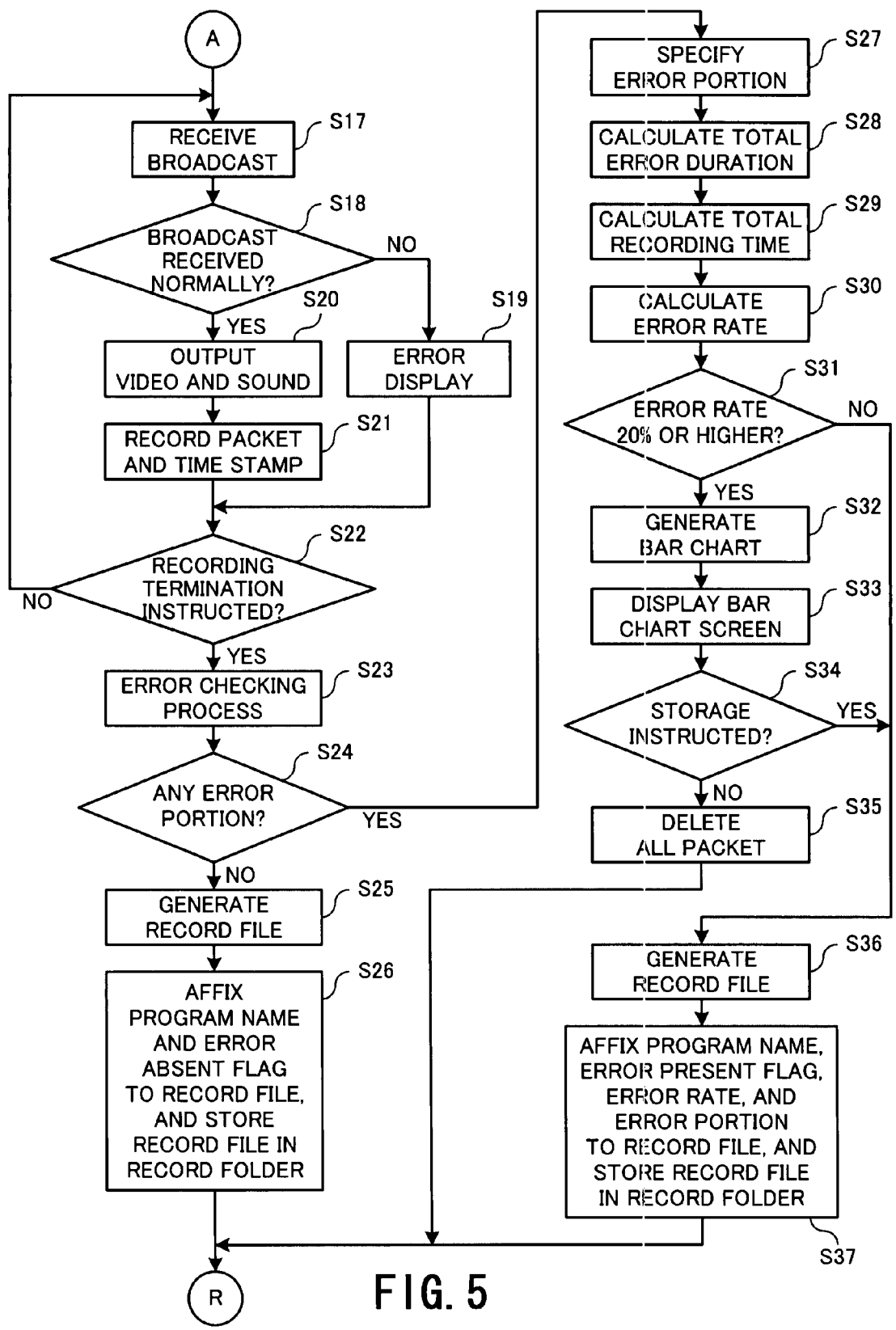
FIG. 5 is a flowchart continuous from FIG. 4, showing the entire operation of the portable telephone apparatus.
Figure 6:
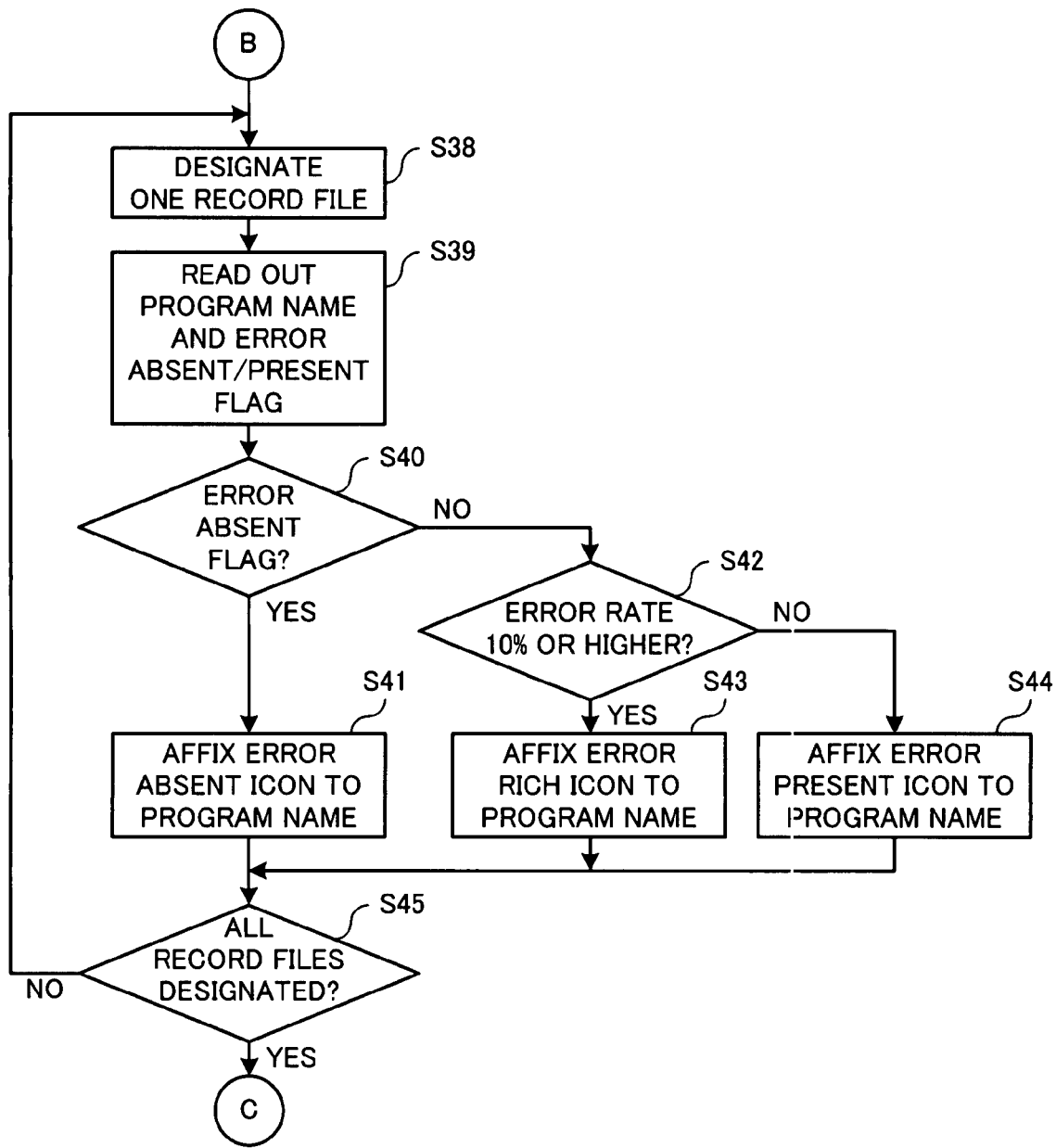
FIG. 6 is a flowchart continuous from FIG. 4, showing the entire operation of the portable telephone apparatus.
Figure 7:
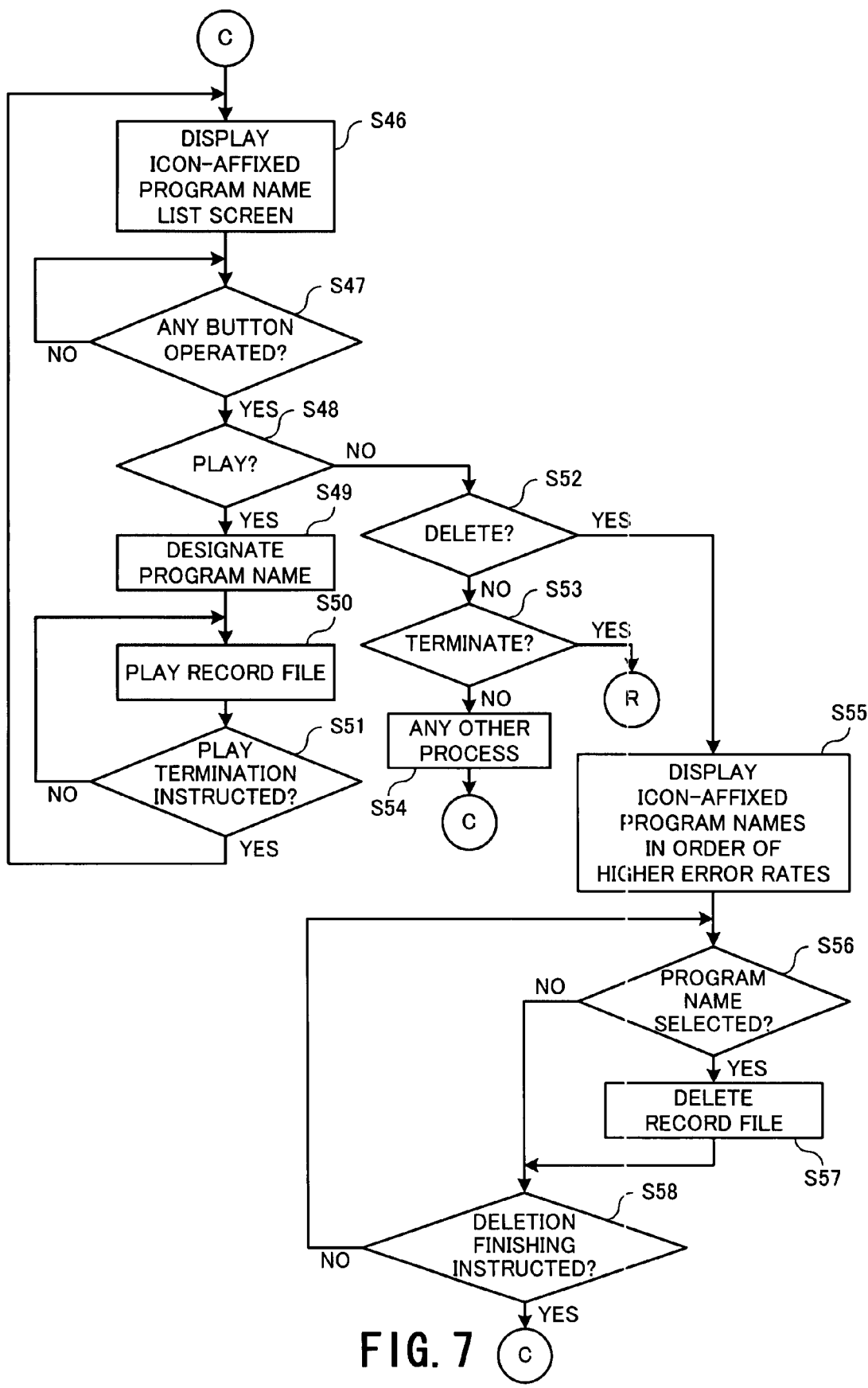
FIG. 7 is a flowchart continuous from FIG. 6, showing the entire operation of the portable telephone apparatus.

First, the CPU 1 activates the telephone communication unit 5 to enter a standby process (step S1 of FIG. 4). Specifically, the CPU 1 registers the current position of the portable telephone apparatus to a telephone exchange through the telephone communication unit 5. Further, the CPU 1 reads out a predetermined standby image from the storage unit 2 and displays it on the main display unit 10 to bring the portable telephone apparatus into a standby state waiting for any phone call or e-mail to come.

In this standby state, the CPU 1 checks whether or not any phone call or e-mail has been received (step S2).

When reception of a phone call or e-mail is detected (step S2; YES), the CPU 1 performs a reception process (step S3), and returns the flow to step S1. Specifically, in this reception process, the CPU 1 notifies the reception by using the sound speaker 13, and answers the phone call or stores the received e-mail.

On the other hand, in a case where neither phone call nor e-mail is detected (step S2; NO), the CPU 1 determines whether or not the key operation unit 12 has been operated by the user (step S4). If no operation has been given (step S4; NO), the flow returns to step S1.

In a case where any operation has been given by the user in the standby state (step S4; YES), the CPU 1 checks whether television viewing has been instructed by an operation on the television broadcast ON/OFF key (step S5). If television viewing has not been instructed (step S5; NO), the CPU 1 checks whether or not an operation for selecting the record folder 21 has been given (step S6). If my other operation than instructing television viewing and selecting the record folder has been given (step S6; NO), the CPU 1 performs a process (any other process) that corresponds to the given operation (step S7), and returns the flow to step S1. Here, other processes may be, for example, making a phone call, generating and sending an e-mail, etc.

In a case where television viewing is instructed at step S5 (step S5; YES), the CPU 1 selects a channel according to the user's operation (step S8), and activates the television. broadcast receiving unit 15 to receive the television broadcast on the channel selected (step S9). Specifically, the television broadcast receiving unit 15 receives broadcast data on which video data, sound data, text data, etc. divided into packets are multiplexed.

Here, the CPU 1 checks whether or not the television broadcast is being received normally (step S10). Specifically, the CPU 1 detects "reception abnormal" or "reception normal" of the television broadcast, by detecting any drop in the reception intensity of the television broadcast airwave, noise intensity, etc. The CPU 1 performs this reception error checking for each predetermined data unit. For example, the CPU 1 performs reception error checking in a data unit, which includes one packet as described above, of the datacast, and video data and sound data of the television broadcast to be output synchronously with the text data included in this packet.

In a case where the television broadcast is not received normally, i.e., in a case where "reception abnormal" is detected (step S10; NO), the CPU 1 presents an error display on the main display unit 10 through the display control unit 9 (step S11). On the other hand, in a case where the television broadcast is received normally, i.e., in a case where "reception normal" is detected (step S10; YES), the CPU 1 outputs the video data of the program now on the air on the selected channel, on the main display unit 10 through the display control unit 9, and outputs the sound data of the program from the sound speaker 13 (step S12).

While the user is viewing the program of the television broadcast whose video and sound are being output, the CPU 1 checks whether the user gives any operation on the key operation unit 12 (step S13).

If no operation is given (step S13; NO), the flow returns to step S9, and the CPU 1 continues receiving the television broadcast on the selected channel and repeats reception error checking. On the other hand, in a case where any operation is given (step S13; YES), the CPU 1 checks whether the operation on the key operation unit 12 is a channel changing operation (step S14).

In a case where the operation on the key operation unit 12 is not a channel changing operation (step S14; NO), the CPU 1 checks whether the operation on the key operation unit 12 is a recording instructing operation (step S15). If the operation on the key operation unit 12 is any other operation than channel changing and recording instructing (step S15; NO), the CPU 1 determines that user instructs termination of television viewing, and returns the flow to step S1 to bring the portable telephone apparatus back to the initial standby state.

In a case where the user changes channels during television viewing at step S14 (step S14; YES), the CPU 1 returns the flow to step S8 to repeal: the process of step S8 to step S13. Specifically, the CPU 1 selects the channel, which it; intended by the channel changing operation (step S8), and receives the television broadcast on the channel selected by the change (step S9). After this, the CPU 1 performs steps S10 to S13.

In a case where the user instructs recording during television viewing at step S15, i.e., in a case where the recording start key is operated and recording of the television broadcast is instructed (step S15; YES), the CPU 1 acquires the "program name" of the program now on the air, from the EPG or the like (step S16).

The CPU 1 continuously receives the television broadcast on the channel currently selected (step S17 of FIG. 5), and checks whether or not the television broadcast is being received normally (step S18). If "reception abnormal" is detected in the television broadcast (step S18; NO), the CPU 1 presents an error display on the main display unit 10 (step S19). On the other hand, if "reception normal" is detected in the television broadcast (step S18; YES), the CPU 1 outputs the video data of the received television broadcast on the main display unit 10, and outputs the sound data of the television broadcast from the sound speaker 13 (step S20).

Furthermore, in the case where the television broadcast is received normally, the CPU 1 temporarily records the packet of the received broadcast data together with the time stamp in a work area of the memory 4 (step S21).

Next, the CPU 1 detects any operation on the key operation unit 12 by the user, and determines whether the user instructs termination of recording (step S22). In a case where termination of recording is not instructed (step S22; NO), the CPU 1 returns the flow to step S17 and repeats the process of step S17 to step S21. That is, until termination of recording is instructed, broadcast data recording is repeated.

Through this process, the broadcast data is checked about reception error in the predetermined data unit described above, and if "reception normal" is detected, the time stamp set in the packet of the datacast included in the data unit is recorded in the work area of the memory 4 in time series, as information indicating the receiving condition of the broadcast data. Furthermore, in association with the information indicating the receiving condition, the packets of the broadcast data (packets (if video data, sound data, and text data) included in the data unit are stored in the work area of the memory 4 sequentially.

When termination of recording is instructed by the user (step S22; YES), the CPU 1 performs error checking process in response to the instruction, by using the time stamps stored in time series (step S23). Specifically, the CPU 1 sequentially compares adjoining time stamps among the time stamps stored in time series, and determines whether or not the time stamps are temporally continuous. Then, the CPU 1 checks presence or absence of any error portion, at which the recorded broadcast data has not been received normally, based on the determination result.

The time stamp is set in the "header information" or "administration block information" launched from the broadcasting station at regular intervals. Accordingly, in a case where, for example, the interval is two seconds, the time stamps should be continuous at intervals of two seconds, like . . . , "20:00:00", "20:00:02", "20:00:04", . . . . Therefore, if there is an interval longer than two seconds between any adjoining time stamps among the time stamps stored in the memory 4 in time series, such as like . . . , "20:00:02", "20:00:12", . . . , or . . . , "20:05:54", "20:06:04", . . . , the CPU 1 recognizes that this portion is temporally discontinuous, and specifies this discontinuous portion as an error portion.

The CPU 1 determines whether or not the broadcast data temporarily stored in the memory 4 includes any error portion, based on the result of this error checking process (step S24).

If there is not any error portion in the recorded broadcast data (step S24; NO), the CPU 1 recognizes that all the packets of the broadcast data have been normally received and recorded, and generates a record file by reading out all the packets of the broadcast data temporarily stored in the memory 4 and transforming them into a file format (step S25).

Then, the CPU 1 affixes the "program name" acquired at step S16 and an "error absent flag" indicating that the record file includes no error portion, to the record file, stores (saves) the record file in the record folder 21 (step S26), and returns the flow to step S1.

On the other hand, if there is any error portion at all in the recorded broadcast data step S24; YES), the CPU 1 specifies the error portion by extracting the start time and end time of the error portion from the time stamps stored in time series, and temporarily stores all error portions that are specified in the memory 4 (step S27). For example, in a case where the time stamps should be continuous at every two seconds, but any adjoining time stamps are "20:00:02" and "20:00:12" and apart by more than two seconds, the CPU 1 extracts this portion, and specifies the error portion as "20:00:02" to "20:00:12".

Then, the CPU 1 calculates the error duration of the specified error portion. For example, in a case where any error portion is "20:00:02" to "20:00:12", the CPU 1 calculates the error duration as ten seconds. Further, the CPU 1 adds up error durations of all the error portions specified to calculate the total error duration (step S28).

Then, the CPU 1 calculates the total recording time, based on the time stamp (recording start time) of the first packet of the recorded datacast and the time stamp (recording end time) of the last packet (step S29).

Then, the CPU 1 calculates an error rate, which indicates a rate of the total error duration to the total recording time (step S30).

The CPU 1 may acquire the recording start time from the RTC 14 and temporarily store it in the memory 4 when the user instructs start of recording at step S15, and acquire the recording end time from the RTC 14 and temporarily store it in the memory 4 when the user instructs termination of recording at step S22, so that the total recording time may be calculated based on these recording start time and recording end time.

Next, the CPU 1 determines whether the calculated error rate is 20% or higher (step S31).

If the error rate is lower than 20% (step S31; NO), the (CPU 1 recognizes that the user will have no big difficulty viewing the recorded broadcast data, and generates a record file by reading out all the packets of the broadcast data temporarily stored in the memory 4 and transforming them into a file format (step S36).

Then, the CPU 1 affixes the "program name" acquired at step S16, an "error present flag" indicating that the record file includes any error portion, the "error rate" calculated at step S30, and "error portion(s)" specified at step S27, to the record file, stores the record file in the record folder 21 (step S37), and return the flow to step S1. Specifically, the affixation manner is to set "error portion(s)" in the "ECC" of the record file shown in FIG. 3, and further to set "program name", "error rate", and "error absent flag" or "error present flag" in the "administration data" of the record file.

"Error portion(s)", "error rate", "error absent flag", and "error present flag" indicate the recording condition of the record file.

In a case where the error rate is 20% or higher (step S31; YES), the CPU 1 recognizes that the recorded broadcast data is not worth viewing, and generates a bar chart showing a schematized distribution of the error duration of each error portion in the total recording time (step S32).

Next, the CPU 1 displays a bar cart screen, which integrates the generated bar chart, the error rate, and a storage necessary/unnecessary message for asking the user whether to store the record file, on the main display unit 10 (step S33).

Figure 8:
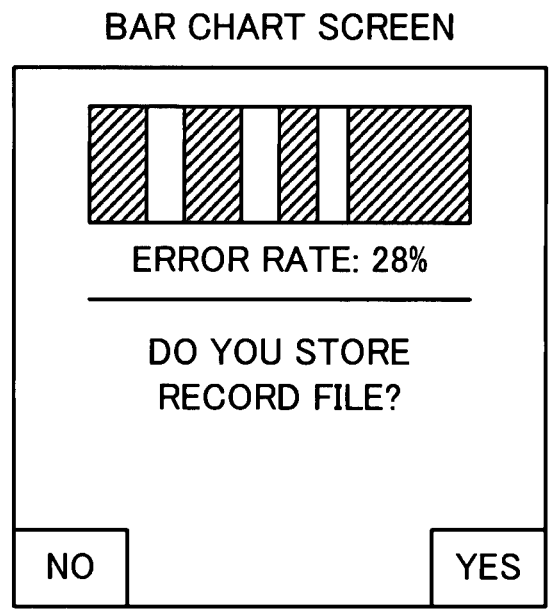
FIG. 8 is a diagram showing an example of a bar chart screen.

FIG. 8 is a diagram showing an example of the bar chart screen.

As shown in FIG. 8, the bar chart clearly indicates each error portion on a bar, which extends in a lateral direction to represent the total recording time. Specifically, each error portion is indicated by an error duration belt indicating the interval between the error start time to the error end time, in the belt of the total recording time indicating the interval between the recording start time to the recording end time. In FIG. 8, the blank portions on the bar chart indicate the error portions, and the slash-hatched portions indicate the portions recorded normally. This bar chart shows the recording condition of the recorded broadcast data as the distribution of the error portions in the entire broadcast data. FIG. 8 illustrates a case where the "error rate" is 28%. The bar chart and the error rate both show the recording condition of the recorded broadcast data, by indicating the relationship between the recorded broadcast data on the whole and the error portions.

A "YES" button and a "NO" button are allocated on this bar chart screen, to answer the storage necessary/unnecessary message. The user checks the bar chart and error rate to determine whether or not to store a record file, and operates the "YES" button when requesting storage of a record file, or the "NO" button when not requesting storage.

In response to the user's operation on the "YES" button or the "NO" button, the CPU 1 determines whether or not the user has instructed storing, a record file (step S34). In a case where the "NO" button is operated and storage of a record file is not requested (step S34; NO), the CPU 1 deletes all the packet of the broadcast data temporarily stored in the memory 4 (step S35), and returns the flow to step S1.

On the other hand, in a case where the "YES" button is operated and storage of a record file is requested (step S34; YES), the flow proceeds to step S36 described above. That is, the CPU 1 generates a record file by reading out all the packets of the broadcast data temporarily stored in the memory 4 and transforming them into a file format (step S36). Then, the CPU 1 affixes "program name", "error present flag", "error rate", "error portion(s)" to the record file and stores the record file in the record folder 21 (step S37). Then, the CPU 1 returns the flow to step S1, to bring the portable telephone apparatus back to the initial standby state.

After this, each time recording is instructed at step S15, the recording process of step S16 to S37 described above will be repeated.

If a folder selecting operation for selecting the record folder 21 is given at step S6 (step S6; YES), the CPU 1 designates one record file from the record files, which are stored in the record folder 21 through the above-described recording process (step S38 of FIG. 6).

The CPU 1 reads out the "program name" and "error absent flag" or "error present flag" of the designated record file, from the record folder 21 (step S39). Hereinafter, "error absent flag" or "error present flag" will be referred to as "error absent/present flag".

The CPU 1 checks whether there is any error portion based on the read-out "error absent/present flag" (step S40). In a case where the read-out "error absent/present flag" is an "error absent flag" (step S40; YES), the CPU 1 generates an "icon-affixed program name", by affixing an "error absent icon" indicating that the record file includes no error portion, to the "program name" read out at step S39 (step S41).

On the other hand, in a case where the read-out "error absent/present flag" is not an "error absent flag" but an "error present flag" (step S40; NO), the CPU 1 reads out the "error rate" of the designated record file from the record folder 21, and checks whether the error rate is 10% or higher (step S42).

If the "error rate" is 10% or higher (step S42; YES), the CPU 1 generates an "icon-affixed program name", by affixing an "error rich icon" indicating that the record file includes many error portions, to the "program name" read out at step S39 (step S43).

On the other hand, if the "error rate" is lower than 10% (step S42; NO), the CPU 1 generates an "icon-affixed program name", by affixing an "error present icon" indicating that the record file includes any error portion, to the "program name" read out at step S39 (step S44).

When an "icon-affixed program name" is generated at step S41, S43, or S44, the CPU 1 checks whether all the record files stored in the record folder 21 have been designated (step S45). In a case where not all the record files have been designated (step S45; NO), the flow returns to step S38 and the CPU 1 repeats the operations of steps S38 to S45 until all the record files are designated.

When "icon-affixed program names" of all the record files are generated after all the record files are designated (step S45; YES), the CPU 1 displays an icon-affixed program name list screen showing the list of all the "icon-affixed program names" generated, on the main display unit 10 (step S46 of FIG. 7).

Figure 9:
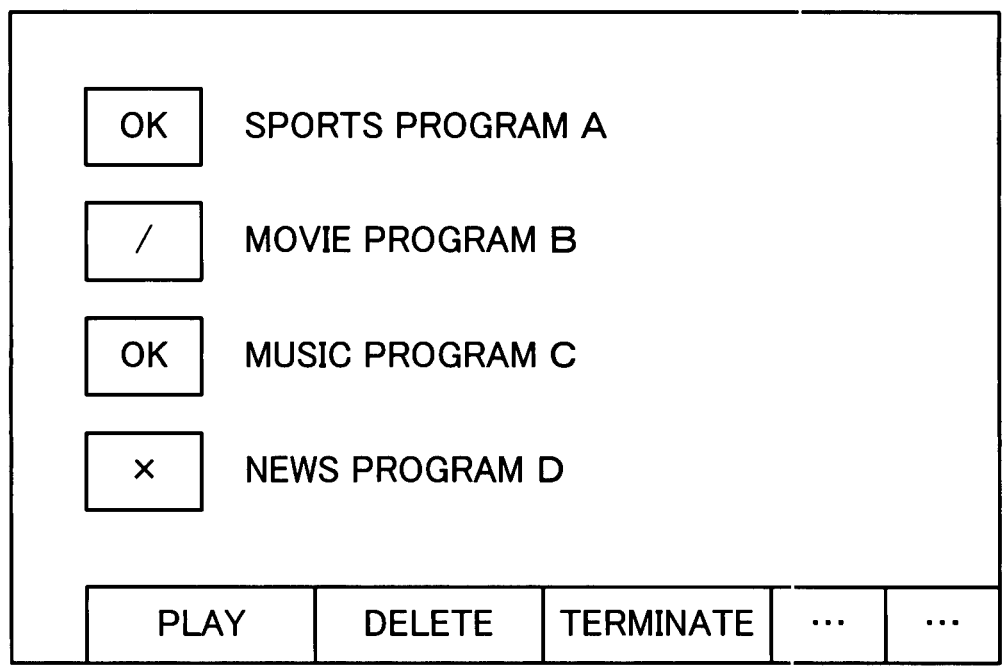
FIG. 9 is a diagram showing an example of an icon-affixed program name list screen.

FIG. 9 is a diagram showing an example of the icon-affixed program name list screen.

As shown in FIG. 9, the list of "icon-affixed program names" having an icon affixed at their head to show the recording condition is displayed on the icon-affixed program name list screen. In FIG. 9, for example, "OK" indicates an error absent icon, "x" indicates an error rich icon, and "/" indicates an error present icon. Further, buttons for "play", "delete", "terminate", etc. are displayed on this list screen under the list of "icon-affixed program names".

The user looks at the icons on this list screen, checks the recording condition of each record file, and determines whether to play, delete, or make any other operation to the record file. When wanting to play the record file, the user operates the key operation unit 12 and depresses the "play" button. When wanting to delete the record file, the user operates the key operation unit 12 and depresses the "delete" button. When wanting to terminate operations on this list screen, the user operates the key operation unit 12 and depresses the "terminate" button.

The CPU 1 determines whether or not any button on this list screen is operated (step S47), and waits until any button is operated when none of the buttons is operated (step S47; NO).

On the other hand, in a case where any button is operated (step S47; YES), the CPU 1 checks whether the operated button is the "play" button (step S48), the "delete" button (step S52), or the "terminate" button (step S53). Specifically, when any button is operated on the icon-affixed program name list screen (step S47; YES), the CPU 1 first determines whether the "play" button is operated or not (step S48). In a case where the "play" button is not operated (step S48; NO), the CPU 1 determines whether or not the "delete" button is operated (step S52). In a case where neither the "play" button nor the "delete" button is operated (step S52; NO), the CPU 1 determines whether or not the "terminate" button is operated (step S53).

In a case where the "play" button is operated (step S48; YES), the CPU 1 designates one selected "program name", in response to an operation of the user to select one program name from the "icon-affixed program names" on the list screen (step S49).

Next, the CPU 1 reads out the record file corresponding to the designated program name from the record folder 21, and starts playing the read-out record file (step S50).

Then, the CPU 1 checks whether an instruction to terminate playing the record file is given (step S51). In a case where no instruction to terminate playing is given (step S51; NO), the flow returns to step S50 and the CPU 1 continues the playing operation until an instruction to terminate playing is given. When an instruction to terminate playing is given (step S51; YES), the CPU 1 terminates playing the record file in response to the instruction, returns the flow to step S46, and brings back the icon-affixed program name list screen on the main display unit 10.

In a case where the "delete" button is operated on the icon-affixed program name list screen (step S52; YES), the CPU 1 displays the "icon-affixed program names" in the order of higher "error rates" of the corresponding record files (step S55). That is, the CPU 1 edits the order of arrangement of the "icon-affixed program names" on the icon-affixed program name list screen, in accordance with the "error rates" of the recording files. Specifically, the CPU 1 reads out the "error rates" of the respective record files from the record folder 21, compares them, and rearranges the "icon-affixed program names" corresponding to the record files in the order of higher "error rates".

On this rearranged list screen, the CPU 1 determines whether or not one program name is selected as an object of deletion in response to an operation of the user (step S56). When a program name is selected (step S56; YES), the CPU 1 deletes the record file corresponding to the selected program name from the record folder 21 (step S57). In a case where no program name is selected (step S56; NO), the (CPU 1 checks whether an instruction to finish deleting any record file is given (step S51). Note that also in the case where any record file is deleted at step S57, the flow proceeds to step S58. In a case where no instruction to finish deleting is given (step S58: NO), the flow returns to step S56, and the CPU 1 continues determining whether or not any program name is selected until an instruction to finish deleting is given. When an instruction to finish deleting is given (step S58; YES), the CPU 1 returns the flow to step S46 in response to this instruction, and brings back the icon-affixed program name list screen before the delete button is operated, on the main display unit 10.

In a case where the "terminate" button is operated on the icon-affixed program name list screen (step S53; YES), the CPU 1 returns the flow to step S1, and brings the portable telephone apparatus back to the initial standby state.

On the other hand, in a case where any other button than the "play" button, the "delete" button, and the "terminate" button is operated (step S53; NO), the CPU 1 performs a process (any other process) that corresponds to the operated button (step S54), and returns the flow to step S46. Other processes that may be performed here include, for example, a process for editing the content of a record file arbitrarily selected, a process for generating a bar chart of a record file arbitrarily selected and displaying a bar chart screen, etc.

Any record file stores an "error absent/present flag", an "error rate", and an "error portion" in the "administration data" and the "ECC". Therefore, even after a record file is generated, the CPU 1 can generate and display a bar chart indicating the recording condition of a record file freely at any time, by reading out these kinds of information from the record file.

The entire operation of the portable telephone apparatus explained above is terminated when the power of the portable telephone apparatus is turned off.

As explained above, in the present embodiment, the CPU 1 determines the receiving condition of broadcast data received by the television broadcast receiving unit 15 in the order of reception, while recording the received broadcast data, and records information indicating the receiving condition according to the result of determination. Further, the CPU 1 obtains information indicating the recording condition of the recorded broadcast data based on the information indicating the receiving condition, and displays the obtained information on the main display unit 10 to notify the user of the recording condition. Accordingly, the user can easily check the recording condition of the recorded content of broadcast data anytime by the notification of the recording condition, without checking the recording condition by playing the recorded content. Further, the user can efficiently delete, save, or make any other operation to the recorded content, by referring to the notification of the recording condition.

Further, the CPU 1 sequentially receives time stamps (time information) synchronous with broadcast data while receiving and recording the broadcast data, and records the time stamps in time series as information indicating the receiving condition. After this, the CPU 1 determines whether or not the time stamps recorded in time series are temporally continuous, and specifies any error portion (abnormally received portion) where the recorded broadcast data has not been received normally, according to the result of determination. Furthermore, the CPU 1 acquires information indicating the recording condition based on the specified error portion, and displays the acquired information on the main display unit 10. Accordingly, based on whether or not time stamps have been received or not, the recording condition can be easily and securely acquired.

The CPU 1 displays information indicating the recording condition of broadcast data, when receiving and recording of the broadcast data are finished. Accordingly, the user can know the recording condition of the broadcast data immediately after the recording of the broadcast data is finished, and can quickly decide what to do accordingly.

The CPU 1 generates information indicating the relationship between the total of the broadcast data recorded and any error portion, as information indicating the recording condition, based on the total recording time which is from the start of receiving and recording of the broadcast data until the end thereof and the duration of the error portion. Accordingly, the user can know the relationship between the total of the recorded broadcast data and the error portion.

The CPU 1 displays a bar chart showing the distribution of error portions in the total of the broadcast data recorded. Accordingly, the recording condition can be informed to the user in a visually understandable manner. Further, the user can intuitively decide whether to delete or save the recorded broadcast data, based on the display of this bar chart.

The CPU 1 displays the rate of the total error duration of the error portions to the total recording time. Accordingly, the user can further be convinced in deciding whether to delete or save the recorded broadcast data.

Further, in the present embodiment, the CPU 1 displays a screen listing the record files stored in the record folder 21. This list screen displays the program name (identification information) corresponding to each record file, together with an icon showing the recording condition of the record file. Accordingly, the user can visually know the recording condition of each record file from this list screen.

The CPU 1 displays the list screen by determining the order to arrange the program names of the respective record files according to the recording condition of each record file. Accordingly, the program names can be arranged on the list screen in the order of those higher in the error rate, and the user can quickly find out a desired object of deletion when deleting any record file.

In the present embodiment, the CPU 1 determines the receiving condition of broadcast data in the order of reception while receiving and recording the data, and records information indicating the receiving condition according to the result of determination. Further, the CPU 1 obtains information indicating the recording condition of the recorded broadcast data based on the information indicating the receiving condition, and controls whether or not to store the recorded broadcast data according to the obtained information. Accordingly, it is possible to control whether or not to store the recorded content of broadcast data according to the recording condition of the content, with no need for the user to check the recording condition. Further, by this control, the user can efficiently delete or save (store) the recorded content.

The CPU 1 quantifies the recording condition of the broadcast data as an error rate, and stores the recorded broadcast data in a case where the error rate is equal to or lower than a predetermined threshold. Accordingly, broadcast data that has been recorded in a fine state can be automatically stored.

The CPU 1 controls storage of recorded broadcast data, according to information indicating the recording condition of the broadcast data, when recording of the broadcast data is finished. Accordingly, the portable telephone apparatus can allow the user to control storage of the recorded broadcast data, immediately after the recording of the broadcast data is finished.

In the present embodiment, the CPU 1 determines the receiving condition of broadcast data received by the television broadcast receiving unit 15 in the order of reception, while recording the received broadcast data, and records information indicating the receiving condition in the memory 4 in association with the recorded broadcast data. The CPU 1 obtains information indicating the recording condition of the recorded broadcast data based on the information indicating the receiving condition when finished with recording, and displays a storage necessary/unnecessary message for asking the user whether or not to store the broadcast data recorded in the memory 4 in the record folder 21, together with the information indicating the recording condition. The user determines whether it is necessary or unnecessary to store the recorded broadcast data, based on the displayed information indicating the recording condition. The CPU 1 controls whether to store or to delete the recorded broadcast data, in response to an operation of the user to instruct whether storage is necessary or unnecessary. Accordingly, the user can easily check the recording condition of the recorded content of broadcast data anytime, without checking the recording condition by playing the recorded content. Further, the user can determine whether it is necessary or unnecessary to store the recorded content, according to the recording condition. Furthermore, since the recorded content is controlled to be stored or deleted in response to an operation of the user based on his/her determination, storage or deletion of the recorded content can be efficiently be done.

The embodiment of the present invention has been described. Modified or advanced implementation of the present invention are available by various embodiments, not to limited to the above-described embodiment.

For example, in the above-described embodiment, the CPU 1 sequentially receives time stamps synchronous with broadcast data while receiving and recording the broadcast data, and records the time stamps in the memory 4 in time series. After finished with recording the broadcast data, the CPU 1 determines whether or not the time stamps recorded in time series are temporally continuous at intervals of a predetermined length, and specifies any error portion in the recorded broadcast data according to the result of determination. At this time, the CPU 1 specifies any error portion as the actual times like "20:00:02" to "20:00:12", and sets the times in "ECC" of the record file as information indicating the recording condition. However, the CPU 1 may convert the time stamps to the periods of time that have elapsed since the start of recording of the broadcast data to specify the error portion as elapsed times, and set them in "ECC" of the record file.

Specifically, for example, in a case where the time stamp of the time at which recording of the broadcast data is started is "20:00:00", the CPU 1 sets the elapsed time at this point as "00" (second). If the time stamps are launched at intervals of two seconds, the CPU 1 sets the elapsed time when receiving the next time stamp "20:00:02", as "02" (seconds) as calculated based on the recording start time. Thereafter, the CPU 1 sets "20:00:04" as "04" (seconds), . . . , "20:20:40" as "1240" (seconds), "20:20:42" as "1242" (seconds), . . . . An error portion specified as elapsed times in this manner may be set in "ECC" of the record file. For example, in a case where "40, 42, 44, 46, 256, 258, 260, 262" is set in "ECC" as error portion specified by elapsed times, the portion from 40 seconds to 46 seconds after the recording start time and the portion from 256 seconds to 262 seconds after the recording start time are the error portions.

In the above-described embodiment, an error portion is recorded in "ECC". However, this is not the only case, but reversely any normally recorded portion may be recorded in "ECC" if there are many error portions.

In the above-described embodiment, the CPU 1 sequentially receives time stamps synchronous with broadcast data while receiving and recording the broadcast data, and records the time stamps in the memory 4 in time series. After finished with recording the broadcast data, the CPU 1 determines whether or not the time stamps recorded in time series are temporary continuous at intervals of a predetermined length, and specifies any error portion in the recorded broadcast data according to the result of determination. However, it may not after recording is finished but during recording when the CPU 1 determines whether or not time stamps are normally sequentially received, and specifies any error portion in the broadcast data currently being recorded according to the result of determination.

In the above-described embodiment, the time stamps included in the "header information" and the "administration block information" of a datacast are used for the error checking process. However, error check codes other than time stamps may be used for the error checking process. For example, the portable telephone apparatus may receive error check codes for this checking purpose from a broadcasting station in the order of launch, and use these error check codes to perform the error checking process.

Further, these error check codes may be generated by the portable telephone apparatus. For example, the portable telephone apparatus may measure the time that has elapsed since the recording start time, and use this elapsed time as the error check code. In this case, the portable telephone apparatus may check whether or not the broadcast data is received normally while recording the broadcast data, and record the elapsed time at this time of checking in the memory 4 in time series, if no abnormal reception is detected.

In the above-described embodiment, the bar chart screen is displayed when the recording is finished. However, this is not the only case, but the bar chart screen may be displayed at an arbitrary timing in response to a user operation. Further, when an instruction to play a record file is given, the bar chart screen may, be displayed prior to the play.

In the above-described embodiment, the bar chart screen is displayed in a case where the error rate is 20% or higher. However, the bar chart screen may be displayed in advance of storing a record file, even in a case where the error rate is lower than 20%.

In the above-described embodiment, the distribution of error portions in recorded data is displayed by a bar chart. However, the distribution of error portions may be displayed not only by this, but visually by a pie chart or the like.

In the above-described embodiment, the error rate is displayed on the bar chart screen. However, this is not the only case, but the error rate may be notified by a sound message.

In the above-described embodiment, the broadcast data is recorded while the user is viewing the television broadcast. However, broadcast data may be recorded when the user is not viewing the television broadcast. Further, if the portable telephone apparatus comprises two television tuners, the user may view the program received by one television tuner while at the same time another program received by the other television tuner is recorded.

In the above-described embodiment, in a case where the error rate is 20% or higher when recording is finished, a storage necessary/unnecessary message for asking the user whether or not to store the broadcast data recorded in the memory 4 in the record folder 21 is displayed. The CPU 1 controls storing or deleting of the recorded broadcast data, in response to an operation of the user to instruct whether it is necessary or unnecessary to store the data. However, the CPU 1 may automatically determine whether to store or to delete the recorded broadcast data according to the recordings condition of the recorded broadcast data, and perform storing or deleting.

In the above-described embodiment, the portable telephone apparatus receives and records a television broadcast. However, the present invention can also be applied to a case were the portable telephone apparatus receives and records a radio broadcast.

Furthermore, the present invention is not limited to a portable telephone apparatus, but can likewise be applied to portable terminal apparatuses such as a PDA, an electronic camera, an electronic wristwatch, a music player, etc. with a broadcast data recording function.

The functions of the portable telephone apparatus according to the above-described embodiment can be realized by hardware specially made for this purpose, and further by an ordinary computer system.

For example, in the above-described embodiment, it has been explained that the portable telephone apparatus prestores an operation control program in the program area or the like of the storage unit 2. However, the program for performing the above-described operations may be recorded and distributed in a computer-readable recording medium such as a flexible disk, a CD-ROM (Compact Disk Read-Only Memory), a DVD (Digital Versatile Disk), an MO (Magneto-Optical disk), etc., and then installed on a computer, thereby to constitute an apparatus that performs the above-described operations.

Further, the program may be stored on a disk device or the like possessed by a predetermined server apparatus on a communication network such as the Internet or the like, and, for example, may be embedded on a carrier wave, so that the program may be downloaded on a computer. Furthermore, it is possible to achieve the above-described operations by transferring the program from a server apparatus to a computer through a communication network while simultaneously activating and executing the program.

In a case where an OS (Operating System) assumes some part of the above-described functions or works in cooperation with an application to realize the functions, those other than assumed by the OS may be stored and distributed in a medium, or may be downloaded on a computer.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2006-183972 filed on Jul. 4, 2006 and including specification, claims, drawings and summary. The disclosure of the above Japanese Patent Application is incorporated herein by reference in its entirety.

What is claimed is:

1. A portable terminal apparatus for recording broadcast data received, comprising:
   a determination unit within the portable terminal apparatus, said determination unit determining whether a receiving condition of broadcast data is normal or not, while the broadcast data is recorded;
   a receiving condition information storage unit which stores information indicating the receiving condition apart from the broadcast data, according to a result of determination by the determination unit;
   a recording condition information obtaining unit which obtains information indicating a recording condition of the broadcast data recorded, based on the information indicating the receiving condition stored in the receiving condition information storage unit; and
   a recording condition information output unit which displays the information indicating the recording condition obtained by the recording condition information obtaining unit on a display unit;
   wherein the receiving condition information storage unit stores time information extracted from the broadcast data as information indicating the receiving condition when the determination unit determines the receiving condition of the broadcast data is normal; and wherein the recording condition information obtaining unit specifies any abnormally received portion in the broadcast data based on whether the time information stored in the receiving condition information storage unit is separated by a longer interval than a predetermined length from adjoining time information of the time information, and obtains information indicating the recording condition based on the abnormally received portion.

2. The portable terminal apparatus according to claim 1, wherein the recording condition information output unit displays the information indicating the recording condition on the display unit when recording of the broadcast data is finished.

3. The portable terminal apparatus according to claim 1, wherein the recording condition information obtaining unit generates information indicating a relationship between a total of the broadcast data and the abnormally received portion based on a total recording time which is from a start of recording of the broadcast data until an end thereof and a duration of the abnormally received portion, and obtains the generated information as the information indicating the recording condition.

4. The portable terminal apparatus according to claim 3, wherein the recording condition information obtaining unit generates information indicating a distribution of the abnormally received portion in the total of the broadcast data based on the total recording time and the duration of the abnormally received portion, and obtains the generated information as the information indicating the recording condition.

5. The portable terminal apparatus according to claim 3, wherein the recording condition information obtaining unit calculates a rate of the duration of the abnormally received portion to the total recording, time based on the total recording time and the duration of the abnormally received portion, and obtains the rate as the information indicating the recording condition.

6. The portable terminal apparatus according to claim 1, comprising: a broadcast data storage unit which stores, each time recording of broadcast data is finished, the broadcast data recorded, identification information of the broadcast data, and the information indicating the recording condition of the broadcast data obtained by the recording condition information obtaining unit, in association with one another; and a list output unit which outputs a list of broadcast data, by associating the identification information of each broadcast data stored in the broadcast data storage unit with an icon corresponding to the information indicating the recording condition of the broadcast data.

7. The portable terminal apparatus according to claim 6, wherein the list output unit determines an order in which the identification information of each broadcast data is arranged according to the information indicating the recording condition of each broadcast data, and outputs the list of broadcast data in the determined order.

8. A portable terminal apparatus for recording broadcast data received, comprising:
a determination unit within the portable terminal apparatus, said determination unit determining whether a receiving condition of broadcast data is normal or not, while the broadcast data is recorded;
a receiving condition information storage unit which stores information indicating the receiving condition apart from the broadcast data, according to a result of determination by the determination unit;
a recording condition information obtaining unit which obtains information indicating a recording condition of the broadcast data recorded, based on the information indicating the receiving condition stored in the receiving condition information storage unit; and
a control unit which controls whether or not to store the recorded broadcast data, according to the information indicating the recording condition obtained by the recording condition information obtaining unit;
wherein the receiving condition information storage unit stores time information extracted from the broadcast data as information indicating the receiving condition when the determination unit determines the receiving condition of the broadcast data is normal; and
wherein the recording condition information obtaining unit specifies any abnormally received portion in the broadcast data based on whether the time information stored in the receiving condition information storage unit is separated by a longer interval than a predetermined length from adjoining time information of the time information, and obtains information indicating the recording condition based on the abnormally received portion.

9. The portable terminal apparatus according to claim 8, wherein the recording condition information obtaining unit specified calculates a rate of a duration of the abnormally received portion to a total recording lime which is from a start of recording of the broadcast data until an end thereof, and obtains the rate as the information indicating the recording condition; and the control unit stores the recorded broadcast data, in a case where the rate obtained by the recording condition information obtaining unit is equal to or lower than a predetermined rate.

10. The portable terminal apparatus according to claim 8, wherein the control unit controls whether or not to store the recorded broadcast data, when recording of the broadcast data is finished, according to the information indicating the recording condition obtained by the recording condition information obtaining unit.

11. A non-transitory computer-readable recording medium storing a program for controlling a computer to realize:
a determination function of determining whether a receiving condition of broadcast data is normal or not, while the broadcast data received is recorded by a portable terminal apparatus;
a receiving condition information storage function of storing information indicating the receiving condition apart from the broadcast data, according to a result of determination by the determination function;
a recording condition information obtaining function of obtaining information indicating a recording condition of the broadcast data recorded, based on the information indicating the receiving condition stored by the receiving condition information storage function; and
a recording condition information output function of displaying the information indicating the recording condition obtained by the recording condition information obtaining function on a display unit;
wherein the receiving condition information storage function stores time information extracted from the broadcast data as information indicating the receiving condition when the determination function determines the receiving condition of the broadcast data is normal; and
wherein the recording condition information obtaining function specifies any abnormally received portion in the broadcast data based on whether the time information stored in the receiving condition information storage function is separated by a longer interval than a predetermined length from adjoining time information of the time information, and obtains information indicating the recording condition based on the abnormally received portion.

12. A non-transitory computer-readable recording medium storing a program for controlling a computer to realize:
- a determination function of determining whether a receiving condition of broadcast data is normal or not, while the broadcast data received is recorded by a portable terminal apparatus;
- a receiving condition information storage function of storing information indicating the receiving condition apart from the broadcast data, according to a result of determination by the determination function;
- a recording condition information obtaining function of obtaining information indicating a recording condition of the broadcast data recorded, based on the information indicating the receiving condition stored by the receiving condition information storage function; and
- a control function of controlling whether or not to store the recorded broadcast data, according to the information indicating the recording condition obtained by the recording condition information obtaining function;
- wherein the receiving condition information storage function stores time information extracted from the broadcast data as the information indicating the receiving condition when the determination function determines the receiving condition of the broadcast data is normal; and
- wherein the recording condition information obtaining function specifies any abnormally received portion in the broadcast data based on whether the time information stored in the receiving condition information storage function is separated by a longer interval than a predetermined length from adjoining time information of the time information, and obtains information indicating the recording condition based on the abnormally received portion.

13. A portable terminal apparatus, comprising:
- a receiving unit within the portable terminal apparatus, said receiving unit receiving broadcast data, in which time information is inserted at intervals of a predetermined length;
- a broadcast data recording unit which records the broadcast data received by the receiving unit;
- a time information extracting unit which extracts the time information from the broadcast data received by the receiving unit;
- a discontinuous portion specifying unit which specifies a portion where the time information extracted by the time information extracting unit is separated by a longer interval than the predetermined length from adjoining time information of the time information; and
- an abnormally recorded portion output unit which displays information indicating the portion specified by the discontinuous portion specifying unit, as information indicating an abnormally recorded portion in the broadcast data recorded by the broadcast data recording unit on a display unit.

14. A non-transitory computer-readable recording medium storing a program for controlling a computer to perform:
- a receiving step of receiving broadcast data by a portable terminal apparatus, in which time information is inserted at intervals of a predetermined length;
- a broadcast data recording step of recording the broadcast data received at the receiving step;
- a time information extracting step of extracting the time information from the broadcast data received at the receiving step;
- a discontinuous portion specifying step of specifying a portion where the time information extracted by the time information extracting unit is separated by a longer interval than the predetermined length from adjoining time information of the time information; and
- an abnormally recorded portion outputting step of displaying information indicating the portion specified at the discontinuous portion specifying step as information indicating an abnormally recorded portion in the broadcast data recorded at the broadcast data recording step on a display unit.

* * * * *